United States Patent
Lohtia et al.

(10) Patent No.: US 10,856,189 B2
(45) Date of Patent: *Dec. 1, 2020

(54) SENDING AN IDENTIFIER OF A WIRELESS LOCAL AREA NETWORK TO ENABLE HANDOFF OF A MOBILE STATION TO THE WIRELESS LOCAL AREA NETWORK

(71) Applicant: Apple Inc., Cupertino, CA (US)

(72) Inventors: Anit Lohtia, Plano, TX (US); Yuqiang Tang, Plano, TX (US); Miroslav Budic, Plano, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/511,991

(22) Filed: Jul. 15, 2019

(65) Prior Publication Data
US 2019/0342803 A1 Nov. 7, 2019

Related U.S. Application Data

(63) Continuation of application No. 16/021,814, filed on Jun. 28, 2018, now Pat. No. 10,390,264, which is a
(Continued)

(51) Int. Cl.
*H04W 56/00* (2009.01)
*H04W 36/00* (2009.01)
(Continued)

(52) U.S. Cl.
CPC ......... *H04W 36/0061* (2013.01); *H04W 4/06* (2013.01); *H04W 36/0011* (2013.01);
(Continued)

(58) Field of Classification Search
CPC ............... H04W 36/0061; H04W 4/06; H04W 36/0011; H04W 36/14; H04W 48/08; H04W 48/12
(Continued)

(56) References Cited

U.S. PATENT DOCUMENTS

| 6,138,034 A | 10/2000 | Willey |
| 2003/0125028 A1 | 7/2003 | Reynolds |

(Continued)

FOREIGN PATENT DOCUMENTS

EP       1006746       6/2000

OTHER PUBLICATIONS

International Search Report and Written Opinion in PCT Application No. PCT/US2006/032961 dated Mar. 8, 2007, 9 pages.
(Continued)

*Primary Examiner* — Sai Ming Chan
(74) *Attorney, Agent, or Firm* — Kowert, Hood, Munyon, Rankin & Goetzel, P.C.

(57) ABSTRACT

In a wireless communications network, the presence of a wireless local area network in a cell segment is determined. An identifier of the wireless local area network in the cell segment is sent to at least one mobile station in the cell segment to enable the at least one mobile station to hand off to the wireless local area network. Optionally, information identifying geographic boundaries of cell segments and the wireless local area network can be sent to the at least one mobile station.

20 Claims, 3 Drawing Sheets

Related U.S. Application Data continuation of application No. 15/608,001, filed on May 30, 2017, now Pat. No. 10,039,035, which is a continuation of application No. 15/043,777, filed on Feb. 15, 2016, now Pat. No. 9,674,739, which is a continuation of application No. 14/542,814, filed on Nov. 17, 2014, now Pat. No. 9,288,722, which is a continuation of application No. 13/745,970, filed on Jan. 21, 2013, now Pat. No. 8,958,391, which is a continuation of application No. 11/229,390, filed on Sep. 16, 2005, now Pat. No. 8,379,558.

(51) Int. Cl.
*H04W 48/12* (2009.01)
*H04W 36/14* (2009.01)
*H04W 4/06* (2009.01)
*H04W 48/08* (2009.01)
*H04W 8/26* (2009.01)
*H04W 24/00* (2009.01)
*H04W 84/12* (2009.01)
*H04W 88/02* (2009.01)

(52) U.S. Cl.
CPC ........... *H04W 36/14* (2013.01); *H04W 48/08* (2013.01); *H04W 48/12* (2013.01); *H04W 8/26* (2013.01); *H04W 24/00* (2013.01); *H04W 84/12* (2013.01); *H04W 88/02* (2013.01)

(58) Field of Classification Search
USPC ........................................................ 370/436
See application file for complete search history.

(56) References Cited

U.S. PATENT DOCUMENTS

| | | | |
|---|---|---|---|
| 2004/0203732 A1 | 10/2004 | Brusilovsky et al. | |
| 2004/0203792 A1 | 10/2004 | Shaheen et al. | |
| 2004/0203914 A1 | 10/2004 | Kall et al. | |
| 2005/0107085 A1* | 5/2005 | Ozluturk | H04W 36/0061 455/439 |
| 2006/0133319 A1 | 6/2006 | Kant | |
| 2007/0064650 A1* | 3/2007 | Lohtia | H04W 36/0011 370/331 |
| 2012/0178441 A1 | 7/2012 | Shaheen et al. | |
| 2013/0136105 A1 | 5/2013 | Lohtia et al. | |

OTHER PUBLICATIONS

3GPP2 Access Network Interfaces Interoperability Specification, 3rd Generation Partnership Project 2 "3GPP2", 3GPP2 A.S0001-A, Nov. 30, 2000, pp. 1-518.
C. Perkins, Network Working Group, Request for Comments: 2002, IP Mobility Support, Oct. 1996, pp. 1-74.
Johnson, et al, Network Working Group, Request for Comments: 3775, Mobility Support in IPv6, Jun. 2004, 154 pages.
Perkins, Network Working Group, Request for Comments 3220, IP Mobility Support for IPv4, Jan. 2002, pp. 1-92.
Bender, et al. "CDMA/HDR: A Bandwidth-Efficient High-Speed Wireless Data Service for Nomadic Users," IEEE Communications Magazine, IEEE Service Center, vol. 38, No. 7, Jul. 2000, pp. 70-77.
1xEV-DO Inter-Operability Specification (IOS) for CDMA 2000 Access Network Interfaces, 3rd Generation Partnership Project 2 3GPP2:, Release 0, 3GPP2 A.S0007, Ballot Version, Jun. 14, 2001, pp. 1-1 to 5-2, A-1 to DE-2.
Lohtia et al, U.S. Appl. No. 10/947,656, filed Sep. 22, 2004, entitled "Establishing a Session in a Packet-Switched Wireless Communications Network," pp. 1-19, Figs. 1-2.
Lohtia et al, U.S. Appl. No. 10/913,664, filed Aug. 6, 2004, entitled "Receiving an Identifier of a Mobile Station in Packet-Switched Wireless Network", pp. 1-18, Figs. 1-3.
Morales et al., U.S. Appl. No. 09/960,008, filed Sep. 21, 2001, entitled "Method and Apparatus to Control Handoff Between Different Wireless Systems", pp. 1-20, Figs. 1-3.

* cited by examiner

SENDING AN IDENTIFIER OF A WIRELESS LOCAL AREA NETWORK TO ENABLE HANDOFF OF A MOBILE STATION TO THE WIRELESS LOCAL AREA NETWORK

RELATED APPLICATION DATA

The present application is a continuation of U.S. application Ser. No. 16/021,814, filed Jun. 28, 2018, which is a continuation of U.S. application Ser. No. 15/608,001, filed May 30, 2017 (now U.S. Pat. No. 10,039,035) which is a continuation of U.S. application Ser. No. 15/043,777, filed Feb. 15, 2016 know U.S. Pat. No. 9,674,739), which is a continuation of U.S. application Ser. No. 14/542,814, filed Nov. 17, 2014 (now U.S. Pat. No. 9,288,722), which is a continuation of U.S. application Ser. No. 13/745,970, filed Jan. 21, 2013 (now U.S. Pat. No. 8,958,391), which is a continuation of U.S. application Ser. No. 11/229,390, filed Sep. 16, 2005 (now U.S. Pat. No. 8,379,558); the disclosures of each of the above-referenced applications are incorporated by reference herein in their entireties.

TECHNICAL FIELD

The present invention relates generally to sending an identifier of a wireless local area network to a mobile station to enable handoff to the wireless local area network.

BACKGROUND

Mobile communications systems are made up of a plurality of cells or cell sectors. Each cell or cell sector provides a radio communications center through which a mobile station establishes a call or other communications session with another mobile station or a terminal connected to either a circuit-switched network (e.g., public-switched telephone network or PSTN) or a packet-switched data network. Each cell or cell sector includes a base station (or access point) and a base station controller (or radio network controller) to enable communications with mobile stations in the cell or cell sector.

Wireless networks are capable of carrying both circuit-switched and packet-switched traffic (e.g., voice traffic, data traffic, etc.). Examples of wireless networks that support communication of packet-switched traffic include those that operate according to the CDMA 2000 family of standards. The first phase of CDMA 2000 is referred to as 1×RTT (also referred to as 3G1× or 1×), which is designed to increase voice capacity as well as to support data transmission speeds that are faster than typically available. In addition, for even higher data rates, a 1×EV-DO wireless technology has been developed, defined as TIA/EIA/IS-856, "CDMA 2000, High Rate Packet Data Air Interface Specification," which is adopted by the TIA. 1×EV-DO provides relatively high data transfer rates over the air interface between mobile stations and base stations.

Recently, there has been an increase in the use of enterprise and residential wireless local area networks (WLANs). A WLAN refers to a local area network that mobile stations can access wirelessly. A WLAN is a private network, either owned by an organization or municipality (enterprise) or by an individual. A WLAN is usually secured such that only authorized users are allowed to use the WLAN. A WLAN differs from a public cellular wireless network in that the WLAN is limited for use by users of a specific enterprise or a group, whereas the public cellular wireless network is for general use of subscribers of the cellular wireless network.

Examples of standards that define WLANs include IEEE (Institute of Electrical and Electronic Engineers) 802.11, 802.11a, 802.11b, 802.11g, Bluetooth, WiMAX (Worldwide Interoperability for Microwave Access), 802.16, and so forth.

Conventionally, mechanisms have not been provided to enable efficient handoffs from a public cellular wireless network, such as a CDMA 2000 network, to a WLAN, since the cellular wireless network and WLAN operate according to different technologies.

SUMMARY

In general, a method and apparatus for use in a wireless communications network includes determining presence of a wireless local area network in a cell segment, and sending an identifier of the wireless local area network in the cell segment to at least one mobile station in the cell segment to enable the at least one mobile station to hand off to the wireless local area network.

Optionally, according to some embodiments, information identifying geographic boundaries of cell segments and the wireless local area network can be sent to the at least one mobile station.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
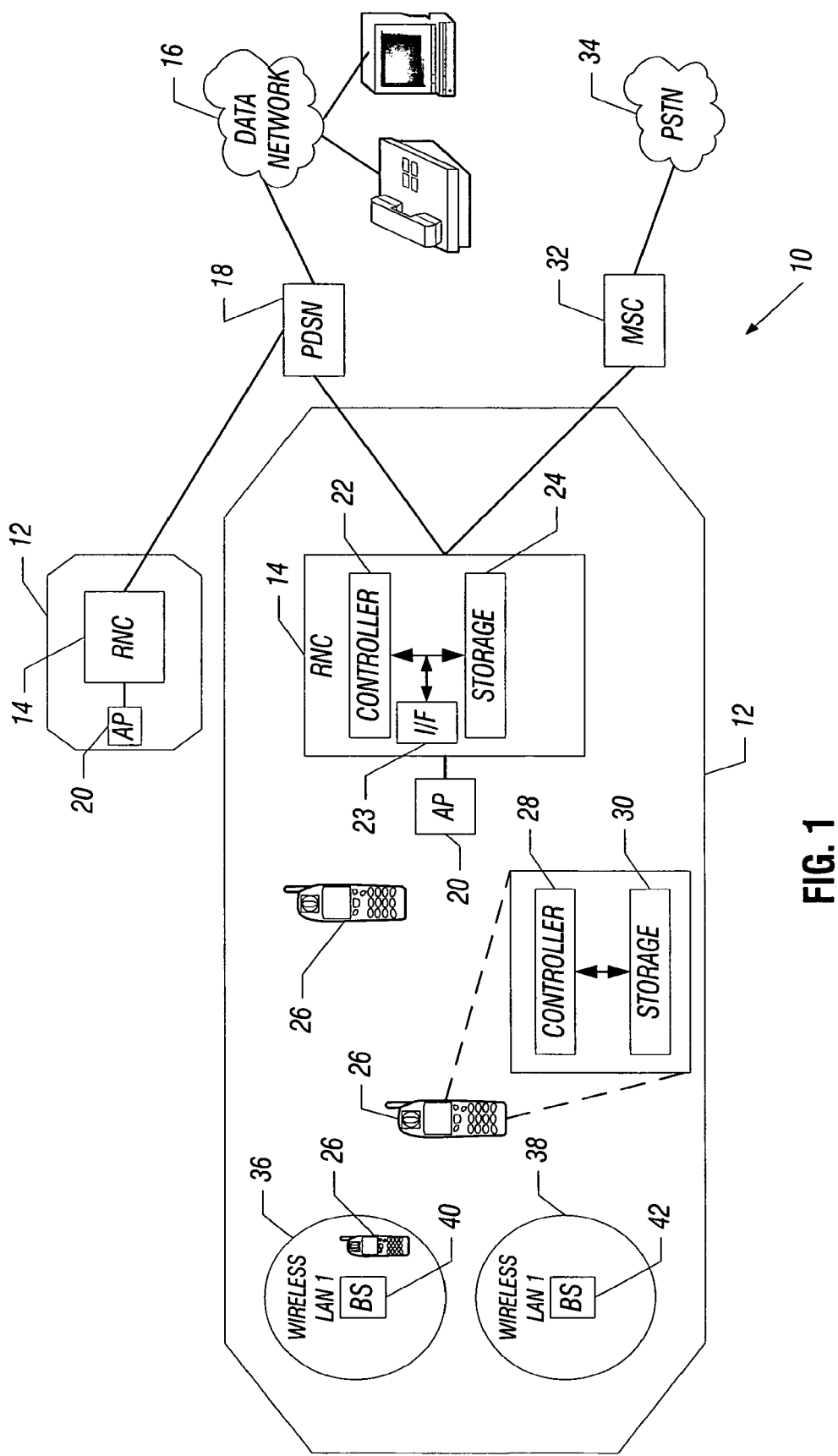
FIG. 1 is a block diagram of an example wireless communications network that includes a public cellular wireless network and wireless local area networks (WLANs).

Referring to FIG. 1, an example wireless communications network 10 includes components that operate according to a public cellular wireless protocol, such as a CDMA (code-division multiple access) 2000 protocol. CDMA 2000 is defined by the CDMA 2000 family of standards (collectively referred to as the IS-2000 Standard, which is developed by the Third Generation Partnership Project 2 (3GPP2)). The CDMA 2000 components of the wireless network 10 can include 1×RTT components, 1×EV-DO components, 1×EV-DV components, and/or other components. In other embodiments, other types of public cellular wireless protocols, such as GSM (Global System for Mobile) and UMTS (Universal Mobile Telecommunications System) protocols, can be used for communications in the wireless communications network 10. A "public cellular wireless protocol" or "public wireless protocol" defines a wireless network that is generally available to any subscriber of the wireless network.

Optionally, for circuit-switched communications, the wireless communications network 10 includes a mobile switching center (MSC) 32 which is responsible for switching mobile station-originated or mobile station-terminated circuit-switched traffic. Effectively, the MSC 32 is the interface for signaling and user traffic between the wireless network 10 and other public-switched networks (such as a public-switched telephone network (PSTN) 34 or other MSCs).

The wireless communications network 10 includes cell segments 12, each associated with a radio network controller (RNC) 14 or base station controller (BSC). A "cell segment" refers to either a cell or cell sector. Typically, in the CDMA 2000 context, a BSC is used in a 1×RTT network, while an RNC is used in a 1×EV-DO or 1×EV-DV network. In this discussion, the term "radio network controller" or "RNC" refers to a 1×EV-DO or 1×EV-DV RNC, a 1×RTT BSC, or any other type of radio network controller or base station controller. Each RNC 14 is connected to an access point 20 (sometimes referred to as a base station transceiver). The access point 20 is an entity used for radio frequency (RF) communications with mobile stations within a cell segment 12.

The RNC 14 supports packet-switched communications, in which packet data is communicated between a mobile station and another endpoint, which can be a terminal coupled to a data network 16 or another mobile station that is capable of communicating packet data. Examples of the data network 16 include private networks (such as local area networks or wide area networks) and public networks (such as the Internet). In one example, the RNC 14 supports packet data services through a packet data serving node (PDSN) 18.

In some embodiments, packet-switched communications are defined by the Internet Protocol (IP). In packet-switched communications (e.g., electronic mail, web browsing, electronic gaming, voice-over-IP, etc.), packets or other units of data carry payload (including user data) as well as header information including routing information (in the form of addresses) used for routing the packets or data units over one or more paths of the network to a destination endpoint. IP defines a type of connectionless, packet-switched communications. One version of IP, referred to as IPv4, is described in Request for Comments (RFC) 791, entitled "Internet Protocol", dated September 1981; and another version of IP, referred to as IPv6, is described in RFC 2460, entitled "Internet Protocol, Version 6 (IPv6) Specification", dated December 1998.

The RNC 14 includes a controller 22 (to perform various tasks) and storage 24 (to store data). The RNC 14 also includes an interface 23 for communicating with mobile stations over wireless links (through the respective access point 20). Mobile stations 26 each also include a controller 28 (to perform various tasks) and a storage 30 (to store data). Examples of mobile stations 26 include mobile telephone handsets, portable computers, personal digital assistants, and so forth.

The RNC 14 is coupled to the PDSN 18 through a data network, such as an R-P (Radio Packet) transport network, to enable packet-switched communications with the packet-switched data network 16. An R-P transport network (or interface) supports establishment of an R-P session, which is a logical connection between the RNC and the PDSN for a particular PPP (Point-to-Point Protocol) session. PPP is described in RFC 1661, entitled "The Point-to-Point Protocol (PPP)," dated July 1994. During a communications session, packet data is routed between a mobile station 26 and another endpoint through an RNC 14, R-P transport network, and PDSN 18.

In the example arrangement of FIG. 1, two wireless local area networks (WLANs) 36 and 38 are depicted as being inside a cell segment 12. Note that in alternative arrangements, a cell segment 12 can include just one WLAN, no WLAN, or more than two WLANs. A WLAN operates according to a different wireless technology than the public cellular wireless network provided by the RNCs 14 in cell segments 12. As examples, protocols that define WLANs include IEEE 802.11, IEEE 802.11a, IEEE 802.11b, IEEE 802.11g, IEEE 802.16, WiMAX, and so forth.

In accordance with some embodiments, the RNCs 14 of the public cellular wireless network and base stations 40, 42 of the WLANs 36, 38 are configured to enable handoffs between cell segments 12 of the public cellular wireless network and the WLAN 36 or 38. The ability to seamlessly hand off a mobile station between a cell segment and a WLAN enables authorized users of the WLAN to start communicating in the WLAN where the users may have access to expanded services and data provided by the WLAN, and/or more advantageous billing arrangements. For example, a user engaged in a voice-over-IP call in the public cellular wireless network can hand off to a WLAN, where the user can continue the voice-over-IP call without interruption. The handoff between the public cellular wireless network and a WLAN can also occur while the user is involved in another type of packet-switched communications (e.g., web browsing, electronic mail, electronic gaming, etc.).

The WLAN 36 includes one or more multiple base stations (or access points) 40, and the WLAN 38 similarly includes one or multiple base stations (or access points) 42. Generally, the base stations that operate within a WLAN have a shorter range than the access points 20 associated with cell segments 12. The WLAN can be associated with an enterprise or with a particular group or residence. Unlike in a public cellular wireless network where any subscriber has access to the cellular wireless network, a WLAN allows only authorized mobile stations to operate within the WLAN. For example, the first WLAN 36 may belong to Company X, while the second WLAN 38 may belong to Company Y. Thus, mobile stations of employees of Company X can operate in WLAN 36 but not in WLAN 38, while mobile stations of employees of Company Y can operate in WLAN 38 but not in WLAN 36. Note that employees of either Company X or Y that are subscribers of the public cellular wireless network are able to operate in the cell segments 12.

In accordance with some embodiments, to enable handoffs between an RNC 14 and a base station in a WLAN, a predetermined message or an information field of an existing message is defined to communicate identifier(s) of WLAN(s) within a cell segment 12 to mobile stations such that the mobile stations are aware of the presence of the WLAN(s). For example, an identifier of a WLAN can be communicated to mobile stations in a broadcast message, such as a message in a broadcast control channel (BCCH). Alternatively, the identifier of a WLAN can be communicated in a neighbor list to a specific mobile station. In other embodiments, other messages or information fields for communicating the identifier of a WLAN can also be used.

According to some embodiments, to enhance security, the identifier of a WLAN that is communicated from an RNC 14 to a mobile station 26 is a "private" identifier, which is different from a service set identifier (SSID) of the WLAN. Communicating the private identifier reduces the occurrence of communicating SSIDs in un-secured messages between an RNC and a mobile station. Communicating an SSID of a WLAN, such as sending the SSID in a broadcast message, poses a security risk in that hackers may obtain such an SSID to hack into a WLAN. Note that a WLAN is typically a secure network in which only authorized users are able to communicate. Allowing a hacker to gain access to a WLAN would thus be undesirable.

As described in further detail below, two types of handoffs are provided by a mechanism according to some embodiments. A first type of handoff is an idle mode handoff, in which handoff is performed between an RNC and a WLAN while the mobile station is not actively communicating traffic (data, voice, etc.). The mobile station is considered to be idle when it is not actively in a call session. The other type of handoff is the active mode handoff, in which handoff occurs between an RNC and a WLAN while the mobile station is active in a call session.

Idle mode handoff is performed by communicating private identifier(s) of WLAN(s) in a cell segment to the mobile stations in a broadcast message (e.g., BCCH). The broadcast of private identifier(s) of WLAN(s) allows notification of available WLANs within a cell segment 12 to mobile stations in the cell segment 12.

To perform active mode handoff, the private identifier(s) of WLAN(s) that a particular mobile station is authorized to use is (are) communicated to the particular mobile station in a neighbor list (e.g., in a NeighborList message). The NeighborList message identifies neighboring cell segments 12 as well as WLANs that a mobile station is able to hand off to. In accordance with some embodiments, the NeighborList message contains special fields that contain identifiers of WLAN(s). According to some embodiments, a first NeighborList message sent to a first mobile station in a given cell segment 12 can contain different neighbors (such as different WLANs) than a second NeighborList message sent to a second mobile station in the given cell segment 12.

For example, the first NeighborList message can identify WLAN 36 but not WLAN 38 to the first mobile station, and the second NeighborList message can identify WLAN 38 but not WLAN 36 to the second mobile station. In another example, the first NeighborList message can identify one or both of WLANs 36, 38, while the second NeighborList message does not identify any WLAN. By not including an identifier of a particular WLAN in a neighbor list sent to a mobile station that the mobile station is not authorized to use, the mobile station would not have to waste resources (e.g., battery power, air interface bandwidth, etc.) scanning for the particular WLAN to find out that the mobile station in fact is not authorized to use the particular WLAN.

A benefit of communicating identifiers of WLANs that are present in a cell segment 12 (such as either in a broadcast message or in a neighbor list) is that mobile stations in the cell segment 12 are explicitly notified of the presence of the WLANs. As a result, the mobile stations in the cell segment 12 would not have to waste resources scanning for WLANs that may or may not be present. Also, by explicitly communicating identifiers of available WLANs, it is ensured that the mobile stations are notified of the presence of WLANs such that the mobile stations will be able to hand off to appropriate WLANs to take advantage of additional features offered by some WLANs to authorized users.

Figure 2:
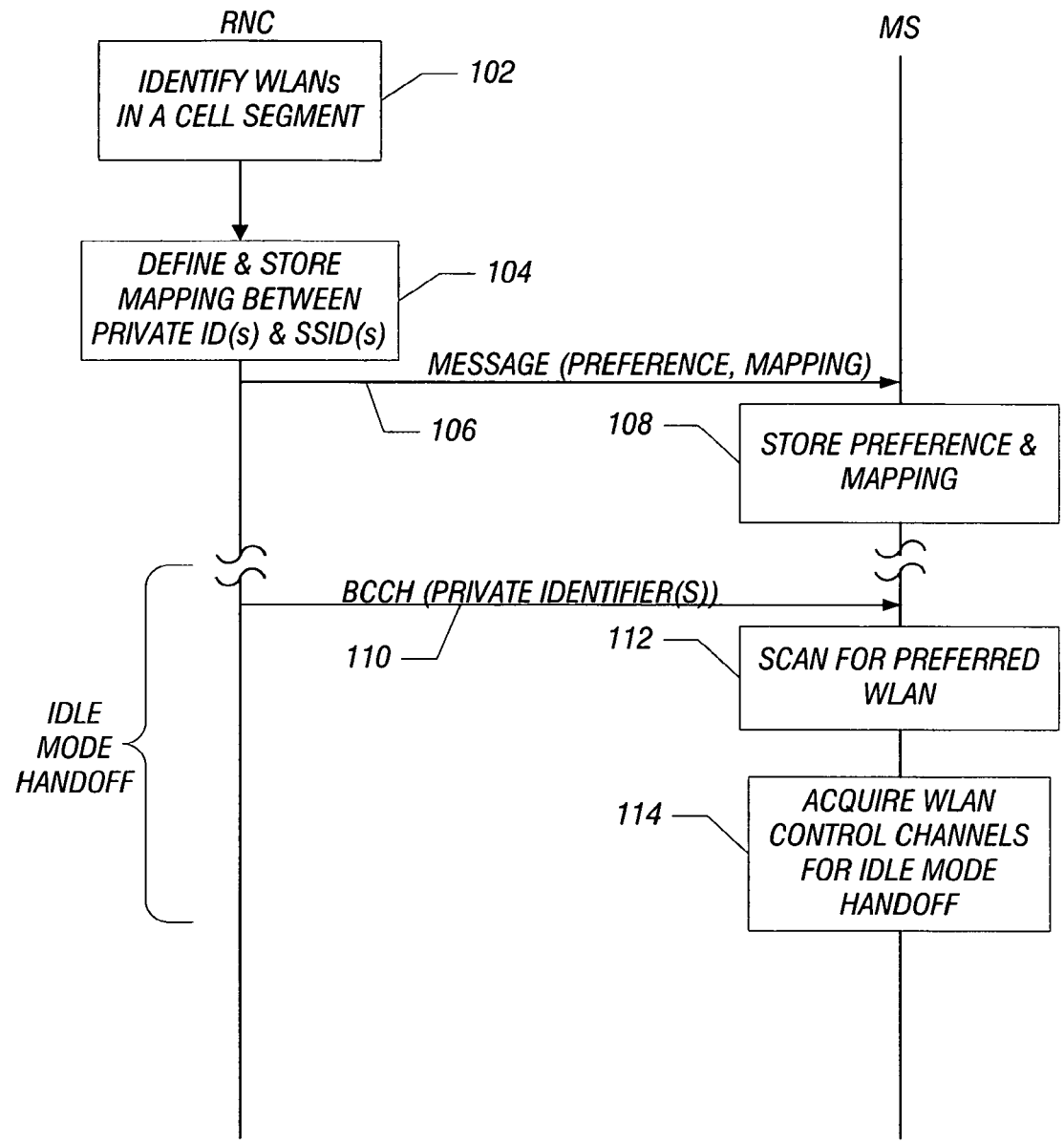
FIG. 2 is a message flow diagram of a process of performing idle mode handoff from the public cellular wireless network to a WLAN, according to an embodiment.

FIG. 2 is a message flow diagram of a process of performing idle mode handoff in a particular cell segment 12. The RNC 14 supporting the particular cell segment 12 identifies (at 102) WLAN(s) in its cell segment. The identification of WLAN(s) is based on information provided to the RNC by the network operator. Information identifying the WLAN(s) in the cell segment 12 is stored in the storage 24 (FIG. 1) of the RNC 14. The RNC 14 also stores (at 104) information mapping private identifier(s) to SSID(s) of respective WLAN(s). A network operator can define proprietary mappings between private identifiers and SSIDs in some implementations.

A message is then sent (at 106) from the RNC 14 to a mobile station 26. Note that the message sent at 106 can also be sent to additional mobile station(s) in the cell segment 12. The message sent at 106 includes preference information regarding the preferred WLAN or WLANs of the mobile station, as well as the mapping information that maps between private ID(s) and SSID(s) for WLAN(s) in the cell segment 12. For security, the message sent at 106 can be encrypted or protected by some other technique to prevent unauthorized access of the mapping between private ID(s) and SSID(s).

The preference information is used by the mobile station to select the preferred WLAN from among plural WLANs. For example, a mobile station may be authorized to use more than one WLAN in a particular cell segment. One of the WLANs would be the preferred WLAN for the mobile station. In other embodiments, preference information is not sent from the RNC to the mobile station. In response to the message sent at 106, the mobile station stores (at 108) the preference information and the mapping information (such as in the storage 30 (FIG. 1) of the mobile station.

For idle mode handoff, the RNC 14 sends (at 110) a broadcast message (e.g., BCCH) containing the private identifier(s) of the WLAN(s) in the cell segment 12. A broadcast message is received by all mobile stations in the cell segment 12. Predefined information fields in the BCCH are used to carry the private identifiers. Alternatively, a different message can be defined to carry the private identifiers. Instead of communicating the private identifiers of WLANs in a cell segment in a broadcast message sent to multiple mobile stations in a cell segment 12, the private identifiers of WLANs can be sent in a message targeted to an individual mobile station.

In response to receiving the private identifier(s) from the RNC, the mobile station scans (at 112) for the preferred WLAN from among the identified WLANs, based on the stored preference information discussed above. Based on scanning for the preferred WLAN, the mobile station acquires (at 114) the WLAN control channels to perform the idle mode handoff from the RNC to a base station of the WLAN, such that the mobile station can subsequently communicate with the base station of the WLAN instead of with the RNC.

Note that similar techniques are employed to perform idle mode handoff from a WLAN to a cell segment.

Figure 3:
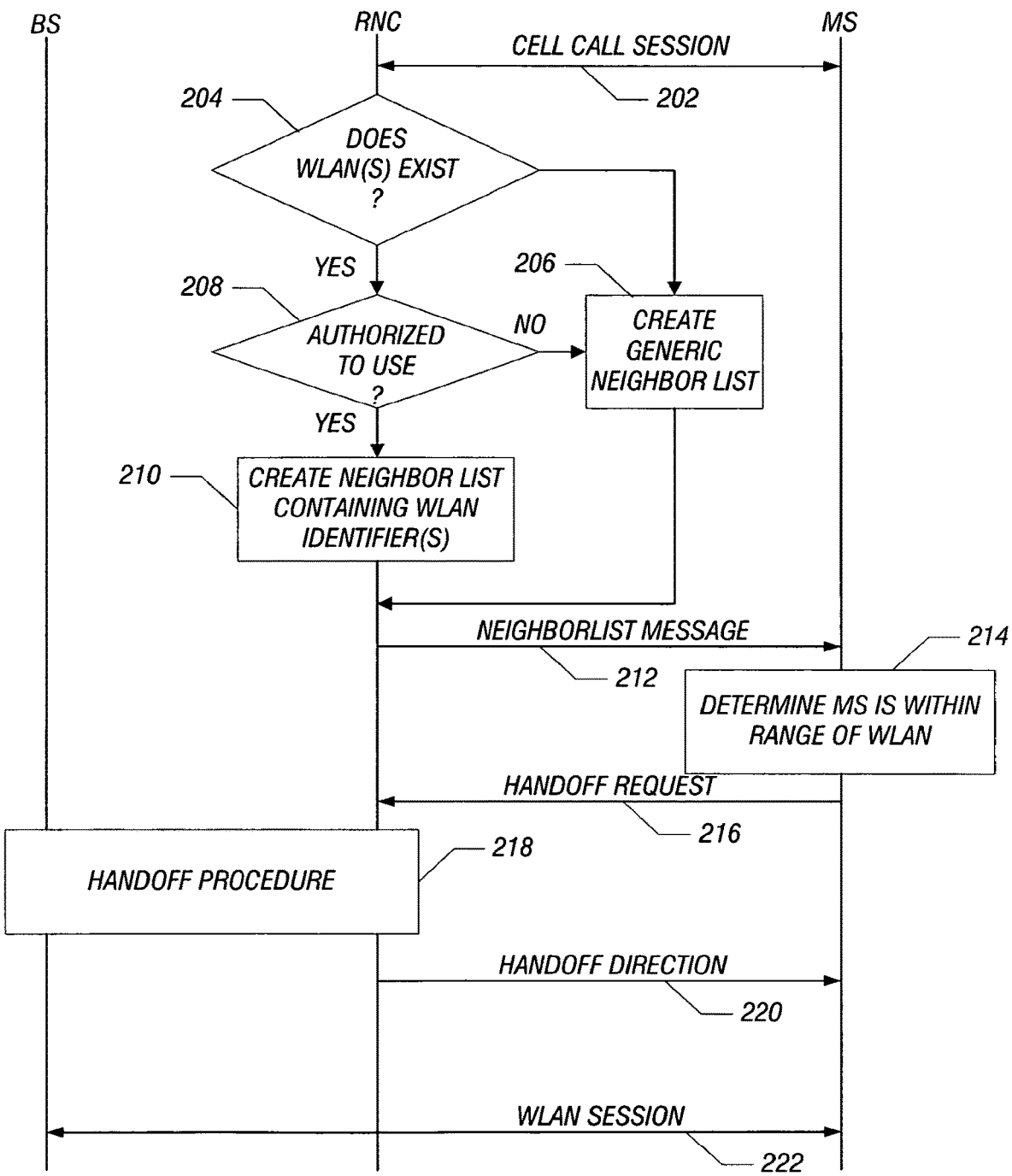
FIG. 3 is a message flow diagram of a process of performing active mode handoff from a public cellular wireless network to a WLAN, according to an embodiment.

FIG. 3 shows a message flow diagram for active mode handoff. Note that tasks 102 and 104 of FIG. 2 have already been performed prior to the start of FIG. 3, and that a cell call session has been established (at 202) between the RNC and mobile station. A cell call session refers to a call session established in the cellular wireless network.

The RNC determines (at 204) if a WLAN exists in the cell segment. If a WLAN does not exist in the cell segment, then the RNC creates (at 206) a generic neighbor list. A generic neighbor list is a neighbor list that identifies other cell segments as neighbors, but that does not identify a WLAN as a candidate neighbor to which a mobile station can hand off.

If the cell segment does contain one or more WLANs, the RNC determines (at 208) whether the mobile station is authorized to use any of the WLAN(s). If not, then the generic neighbor list is created (at 206). However, if the mobile station is authorized to use any of the WLAN(s), then the RNC creates (at 210) a neighbor list that contains WLAN identifier(s) (that the mobile station is authorized to use) as well as identifiers of neighboring cell segments 12.

The RNC sends (at 212) a NeighborList message to the mobile station, where the NeighborList message contains the neighbor list created at 206 or 210. Assuming that a WLAN is present that the mobile station is authorized to use, the mobile station then determines (at 214) whether the mobile station is within range of the WLAN. If so, the mobile station sends a handoff request (at 216) to the RNC. The RNC then performs a handoff procedure (at 218) with the base station of the WLAN. A handoff direction message is then sent (at 220) to the mobile station to direct the mobile station to hand off to the base station of the WLAN. Next, a WLAN session is established (at 222) between the mobile station and the base station of the WLAN to continue the communication of traffic in the WLAN instead of in the cell segment.

Similar techniques are employed to perform active mode handoff from a WLAN to a cell segment.

The determination of whether a mobile station is within the range of a WLAN (performed at 214) can be accomplished in one of a number of different ways. One technique is based on radio frequency (RF) signal measurements, such as RSSI (RF signal strength), C/I (RF signal quality), or RTD (roundtrip delay). However, performing handoff based on measurements of RF signals may not be efficient in some scenarios due to the likelihood of a rapid succession of handoffs (ping-pong handoffs) between two different cell segments or a cell segment and a WLAN at a boundary between the two cell segments or a cell segment and a WLAN.

In an alternative embodiment, instead of basing handoff on measurements of RF signals, a location-based handoff technique is used. The location-based handoff technique involves defining specific (which can be fixed) geographic boundaries between cell segments as well as boundaries of a WLAN within a cell segment. Such information defining geographic boundaries of cell segments and WLANs is communicated by RNCs to a mobile station when the mobile station is located within respective cell segments. A mobile station is able to acquire information relating to its location, and based on this acquired location, determine whether a handoff is appropriate. For example, the mobile station can include a global positioning system (GPS) receiver to establish its location based on GPS coordinates. Alternatively, the location of the mobile station can be based on triangulation based on signals from three different access points in three cell segments. Based on the determined location of the mobile station, the mobile station or RNC (as appropriate) can make a decision regarding whether handoff to a WLAN or to a different cell segment is desirable.

Defining the boundaries of the cell segments and WLANs can be accomplished by performing RF propagation analysis where the network operator performs measurements with an access point or base station in a cell segment or WLAN to determine the appropriate boundaries. Once the geographic boundaries are ascertained, the information identifying boundaries are communicated to mobile stations for storage in the mobile stations. Based on determined geographic locations of the mobile stations, the mobile stations will be able to determine whether handoff to another cell segment or WLAN is appropriate. Alternatively, the information identifying boundaries is not communicated to mobile stations, but rather, is maintained in an RNC or WLAN base station. Based on the geographic location of a mobile station, the RNC or WLAN base station can then determine whether handoff is desirable (or permitted). To avoid the issue of ping-pong handoffs between two cell segments or between a cell segment and a WLAN, hysteresis can be defined for the boundaries.

Instructions of the various software modules (e.g., software modules executed in the RNCs 14, WLAN base stations 40, 42, or mobile stations 26) are loaded for execution on corresponding processors. Processors include microprocessors, microcontrollers, processor modules or subsystems (including one or more microprocessors or microcontrollers), or other control or computing devices. As used here, a "controller" or "control module" refers to hardware, software, or a combination thereof. A "controller" or "control module" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software are loaded or transported to each entity in one of many different ways. For example, code segments including instructions stored on floppy disks, CD or DVD media, a hard disk, or transported through a network interface card, modem, or other interface device are loaded into the entity and executed as corresponding software routines or modules. In the loading or transport process, data signals that are embodied in carrier waves (transmitted over telephone lines, network lines, wireless links, cables, and the like) communicate the code segments, including instructions, to the entity. Such carrier waves are in the form of electrical, optical, acoustical, electromagnetic, or other types of signals.

While some embodiments have been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. An apparatus, comprising:
one or more processing elements, configured to:
 establish a session with a node of a cellular wireless network for communication of data;
 receive, from the node of the cellular wireless network, a message identifying, by explicit identifiers, at least one WLAN of a plurality of WLANs in cell, wherein the message identifies only WLANs the apparatus is authorized to use, and wherein the message communicated specifically to the apparatus from node of the cellular wireless network;
 scan for only the at least one WLAN identified in the message; and
 determine that a first WLAN of the at least one WLAN is in range, and in response, establish a session with the first WLAN to continue the communication of data.

2. The apparatus of claim 1, wherein the one or more processing elements are further configured to receive a handoff direction message to perform handoff to the first WLAN.

3. The apparatus of claim 1, wherein to determine that the first WLAN of the at least one WLAN is in range, the one or more processing elements are further configured to:
determine whether the apparatus is in range for handoff to the first WLAN based on at least radio frequency (RF) signal measurements.

4. The apparatus of claim 1, wherein the one or more processing elements are further configured to:
acquire information relating to a location of the apparatus; and
receive, from the cellular wireless network, geographic information related to a plurality of wireless local area networks (WLANs) for storage in the apparatus.

5. The apparatus of claim 4, wherein the one or more processing elements are configured to receive the geographic information in a first message that is separate from the message identifying the at least one WLAN of the plurality of WLANs.

6. The apparatus of claim 4, wherein the one or more processing elements are further configured to:
determine whether handoff to the first WLAN is permitted based on at least the location of the apparatus and the received geographic information.

7. The apparatus of claim 4, wherein to acquire information relating to the location of the apparatus, the one or more processing elements are further configured to acquire global positioning system (GPS) coordinates or a location based on signals from different access points of the cellular wireless network.

8. The apparatus of claim 4, wherein the geographic information comprises information identifying geographic boundaries related to the plurality of WLANs.

9. A mobile station, comprising:
a memory that stores processor executable program instructions; and
a processor coupled to the memory, wherein the program instructions, when executed by the processor, cause the processor to:
establish a session with a node of a cellular wireless network for communication of data;
receive, from the node of the cellular wireless network, a message identifying, by explicit identifiers, at least one WLAN of a plurality of WLANs in cell, wherein the message identifies only WLANs the mobile station is authorized to use, and wherein the message communicated specifically to the mobile station from node of the cellular wireless network;
scan for only the at least one WLAN identified in the message; and
determine that a first WLAN of the at least one WLAN is in range, and in response, establish a session with the first WLAN to continue the communication of data.

10. The mobile station of claim 9, wherein the program instructions, when executed by the processor, further cause the processor to receive a handoff direction message to perform handoff to the first WLAN.

11. The mobile station of claim 9, wherein to determine that the first WLAN of the at least one WLAN is in range, the program instructions, when executed by the processor, further cause the processor to:
determine whether the mobile station is in range for handoff to the first WLAN based on at least radio frequency (RF) signal measurements.

12. The mobile station of claim 9, wherein the program instructions, when executed by the processor, further cause the processor to:
acquire information relating to a location of the mobile station; and
receive, from the cellular wireless network, geographic information related to a plurality of wireless local area networks (WLANs) for storage in the mobile station.

13. The mobile station of claim 12, wherein the program instructions, when executed by the processor, further cause the processor to receive the geographic information in a first message that is separate from the message identifying the at least one WLAN of the plurality of WLANs.

14. The mobile station of claim 12, wherein the program instructions, when executed by the processor, further cause the processor to:
determine whether handoff to the first WLAN is permitted based on at least the location of the mobile station and the received geographic information.

15. The mobile station of claim 12, wherein to acquire information relating to the location of the mobile station, the program instructions, when executed by the processor, further cause the processor to acquire global positioning system (GPS) coordinates or a location based on signals from different access points of the cellular wireless network.

16. The mobile station of claim 12, wherein the geographic information comprises information identifying geographic boundaries related to the plurality of WLANs.

17. A method of operating a mobile station, comprising:
establishing, by the mobile station, a session with a node of a cellular wireless network for communication of data;
receiving, by the mobile station from the node of the cellular wireless network, a message identifying, by explicit identifiers, at least one WLAN of a plurality of WLANs in cell, wherein the message identifies only WLANs the mobile station is authorized to use, and wherein the message communicated specifically to the mobile station from node of the cellular wireless network;
scanning, by the mobile station, for only the at least one WLAN identified in the message; and
determining, by the mobile station, that a first WLAN of the at least one WLAN is in range, and in response, establishing a session with the first WLAN to continue the communication of data.

18. The method of claim 17, further comprising receiving, by the mobile station, a handoff direction message to perform handoff to the first WLAN.

19. The method of claim 17, determining that the first WLAN of the at least one WLAN is in range comprises determining, by the mobile station, whether the mobile station is in range for handoff to the first WLAN based on at least radio frequency (RF) signal measurements.

20. The method of claim 17, further comprising:
acquiring, by the mobile station, information relating to a location of the mobile station; and
receiving, by the mobile station from the cellular wireless network, geographic information related to a plurality of wireless local area networks (WLANs) for storage in the mobile station.

* * * * *